US012676262B2

(12) United States Patent
Arimitsu et al.

(10) Patent No.: US 12,676,262 B2
(45) Date of Patent: Jul. 7, 2026

(54) COIL DEVICE

(71) Applicant: TDK CORPORATION, Tokyo (JP)

(72) Inventors: Kazunori Arimitsu, Tokyo (JP); Nobuo Kitajima, Tokyo (JP); Kiichi Fujisawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 743 days.

(21) Appl. No.: 17/986,033

(22) Filed: Nov. 14, 2022

(65) Prior Publication Data

US 2023/0162907 A1 May 25, 2023

(30) Foreign Application Priority Data

Nov. 19, 2021 (JP) ................................ 2021-188783

(51) Int. Cl.
*H01F 27/28* (2006.01)
*H01F 27/29* (2006.01)
*H01F 41/04* (2006.01)

(52) U.S. Cl.
CPC ............ *H01F 27/29* (2013.01); *H01F 41/04* (2013.01)

(58) Field of Classification Search
CPC ........ H01F 27/29; H01F 41/04; H01F 17/043; H01F 27/2852; H01F 27/2847; H01F 27/28
USPC ........................................ 336/192, 198, 200
See application file for complete search history.

(56) References Cited

U.S. PATENT DOCUMENTS

| | | | | |
|---|---|---|---|---|
| 2013/0027161 A1* | 1/2013 | Urano | H01F 17/04 336/83 |
| 2014/0002227 A1* | 1/2014 | Hsieh | H01F 5/003 336/200 |
| 2014/0266541 A1* | 9/2014 | Sakamoto | H01F 27/29 29/606 |
| 2016/0217919 A1* | 7/2016 | Iwata | H01F 27/29 |
| 2016/0247626 A1 | 8/2016 | Kawarai et al. | |
| 2017/0221623 A1 | 8/2017 | Kawarai et al. | |
| 2019/0392977 A1 | 12/2019 | Kawarai et al. | |

FOREIGN PATENT DOCUMENTS

| | | |
|---|---|---|
| CN | 102364631 A | 2/2012 |
| CN | 105913998 A | 8/2016 |
| JP | 2018-133402 A | 8/2018 |

* cited by examiner

*Primary Examiner* — Shawki S Ismail
*Assistant Examiner* — Kazi S Hossain
(74) *Attorney, Agent, or Firm* — Oliff PLC

(57) ABSTRACT

An inductor includes a coil; terminals including wire connecting portions connected to lead portions of the coil, and base portions positioned at substantially the same height as a bottom surface of the coil and holding the wire connecting portions; and a core covering the coil together with the wire connecting portions and the base portions. The base portions include main branch portions and sub branch portions. Inner edges of the main branch portions are formed with curved portions curved along an outer peripheral surface of the coil at positions separated from the outer peripheral surface of the coil, respectively. Inner edges of the sub branch portions are formed with curved portions curved along the outer peripheral surface of the coil at positions separated from the outer peripheral surface of the coil, respectively.

11 Claims, 14 Drawing Sheets

COIL DEVICE

BACKGROUND OF THE INVENTION

Field of the Invention

The present invention relates to a coil device used as, for example, an inductor.

Description of the Related Art

As a coil device known as an inductor or the like, for example, a coil device described in Japanese Patent Laid-Open No. 2018-133402 (Patent Literature 1) is known. The coil device described in Patent Literature 1 includes an element body, a coil disposed inside the element body, and a terminal connected to a lead portion of the coil. The terminal includes a wire connecting portion connected to the lead portion of the coil, and a base portion (coil fixing portion) that holds the wire connecting portion. The base portion is disposed inside the element body, and the coil can be disposed on an upper surface of the base portion.

The coil device described above is obtained by disposing a coil and a terminal inside a mold, filling the mold with a magnetic material that constitutes the element body, and performing compression molding. As described above, by disposing the coil on the upper surface of the base portion, there is an advantage that the coil can be prevented from being displaced due to applied pressure during the compression molding.

However, when the coil is disposed on the upper surface of the base portion, the following problem may occur. That is, although a conductor portion of the coil is normally covered with an insulation coating, damage to the insulation coating may expose the conductor portion of the coil. In this case, the base portion and the exposed conductor portion of the coil come into contact with each other either directly or via plating or metal powder of the element body on a surface of the base portion, thereby causing a short circuit between the conductor portion of the coil and the terminal.

Therefore, in order to avoid such a problem, instead of disposing the coil on the upper surface of the base portion, for example, it is conceivable to dispose the coil at a position spaced upward from the upper surface of the base portion, so as to forcibly avoid physical contact between the upper surface of the base portion and a bottom surface of the coil. However, in this case, since the coil is disposed far from the terminal (particularly, the wire connecting portion), processing such as bending the lead portion is required in order to pull out the lead portion of the coil to the position of the wire connecting portion of the terminal. Such processing is not preferable since it causes an increase in man-hours and a deterioration in quality of the coil device.

SUMMARY OF THE INVENTION

The present invention is made in view of such circumstances, and an object thereof is to provide a coil device that prevents occurrence of short circuits and contributes to reducing man-hours and improving quality.

In order to achieve the above object, a coil device according to the present invention includes:

a coil;

a terminal including a wire connecting portion connected to a lead portion of the coil, and a base portion positioned at substantially the same height as a bottom surface of the coil and holding the wire connecting portion; and an element body covering the coil together with the wire connecting portion and the base portion, in which the base portion includes a main branch portion and a sub branch portion, and a curved portion curved along an outer peripheral surface of the coil is formed at a position spaced apart from the outer peripheral surface of the coil on an inner edge of each of the main branch portion and the sub branch portion.

In the coil device according to the present invention, since the base portion is positioned at substantially the same height as a bottom surface of the coil, the lead portion of the coil can be led out to the position of the wire connecting portion and connected thereto without being bent unnecessarily. Therefore, it is possible to prevent damage to the lead portion of the coil and obtain a high-quality coil device. Unnecessary processing (bending) of the coil can be avoided, and the number of man-hours can be reduced.

Since the inner edges (curved portions) of the main branch portion and the sub branch portion are disposed away from the outer peripheral surface of the coil, the main branch and the sub-branch do not come into physical contact with the coil, and it is possible to ensure a sufficient withstand voltage therebetween. Therefore, it is possible to avoid the above problem in the related art (the problem that the conductor portion of the coil and the terminal physically come into contact with each other due to damage to the insulation coating of the coil, thereby causing a short circuit therebetween).

Since the inner edges (curved portions) of the main branch portion and the sub branch portion are curved along the outer peripheral surface of the coil, it is possible to dispose the main branch portion, the sub branch portion, and the wire connecting portion relatively close to the outer peripheral surface of the coil, and it is possible to make the base portion or the wire connecting portion compact. A volume of the coil can be increased by the amount of compactness of the base portion or the wire connecting portion, thereby improving inductance characteristics of the coil device.

Preferably, the main branch portion includes a main protruding portion that protrudes forward of the element body, the sub branch portion includes a sub protruding portion that protrudes rearward of the element body, and one of the main protruding portion and the sub protruding portion is displaced relative to the other of the main protruding portion and the sub protruding portion along a left-right direction perpendicular to a front-rear direction of the element body. By adopting such a configuration, the terminal can be prevented from coming off from the element body and displacement of the base portion in the element body can be prevented particularly in the left-right direction of the element body by an anchoring effect of the main protruding portion and the sub protruding portion. By displacing one of the main protruding portion and the sub protruding portion relative to the other along the left-right direction of the element body, an area occupied by the main protruding portion and the sub protruding portion inside the element body can be sufficiently ensured, so that the above effect can be effectively obtained.

Preferably, an outer edge of the main branch portion is curved forward from a side of the element body inside the element body, an outer edge of the sub branch portion is curved rearward from a side of the element body inside the element body, and a radius of curvature of the outer edge of the main branch portion is different from a radius of curvature of the outer edge of the sub branch portion. By adopting such a configuration, the terminal can be prevented from coming off from the element body and displacement of the base portion in the element body can be prevented particularly in the left-right direction of the element body by an anchoring effect of the main branch portion and the sub branch portion. By making the radius of curvature of the outer edge of the main branch portion different from the radius of curvature of the outer edge of the sub branch portion, the main branch portion or the sub branch portion may be provided with a sufficient size to achieve the above effect, so that the above effect can be effectively obtained.

Preferably, the terminal includes a first terminal and a second terminal,

- the first terminal includes a first base portion,
- the second terminal includes a second base portion,
- the first base portion includes a first main branch portion and a first sub branch portion,
- the second base portion includes a second main branch portion and a second sub branch portion,
- the curved portion includes a first main curved portion formed on an inner edge of the first main branch portion, a first sub curved portion formed on an inner edge of the first sub branch portion, a second main curved portion formed on an inner edge of the second main branch portion, and a second sub curved portion formed on an inner edge of the second sub branch portion, and
- a center position of a virtual circle defined by the first main curved portion, the first sub curved portion, the second main curved portion, and the second sub curved portion substantially coincides with a center position of an inner periphery of the coil.

By adopting such a configuration, it is possible to make a clearance between the outer peripheral surface of the coil and the inner edges of the first base portion (the first main branch portion and the first sub branch portion) substantially constant, and to make a clearance between the outer peripheral surface of the coil and the inner edges of the second base portion (the second main branch portion and the second sub branch portion) substantially constant. Therefore, it is possible to prevent variations in inductance characteristics from occurring for each product. It is also possible to prevent local formation of regions with low withstand voltage between the first base portion and the second base portion and the coil, thereby promoting quality improvement of the coil device.

Preferably, an upper surface of the base portion and the bottom surface of the coil are positioned substantially on the same plane, and a distance between the first main curved portion and the outer peripheral surface of the coil, a distance between the first sub curved portion and the outer peripheral surface of the coil, a distance between the second main curved portion and the outer peripheral surface of the coil, and a distance between the second sub curved portion and the outer peripheral surface of the coil, on the substantially same plane, are substantially equal to one another. When the upper surface of the base portion and the bottom surface of the coil are positioned substantially on the same plane, the lead portion of the coil can be led out to the position of the wire connecting portion and connected thereto without being bent unnecessarily. This point is particularly advantageous in a case where the coil is formed by a flat wire or the like, which is not easy to process, and contributes to the quality improvement of the coil device. By adopting such a configuration, it is possible to maintain a substantially constant clearance between the outer peripheral surface of the coil and the inner edges of the first base portion and the second base portion (first main curved portion, first sub curved portion, second main curved portion, and second sub curved portion), thereby further improving the quality of the coil device.

Preferably, a part of the wire connecting portion is disposed at a position spaced upward from an upper surface of the base portion. By adopting such a configuration, when the lead portion of the coil is led out at a position spaced upward from the upper surface of the base portion, the lead portion of the coil can be led out to the position of the wire connecting portion and connected thereto without being bent unnecessarily.

Preferably, a center position of the coil is displaced to a side opposite to the wire connecting portion relative to a center of the element body along a front-rear direction of the element body. By adopting such a configuration, it is possible to ensure a sufficient volume of the element body in front of the element body (on a side where the wire connecting portion is disposed). Therefore, it is possible to cover the wire connecting portion and the lead portion of the coil connected thereto with a sufficient amount of the element body and protect the wire connecting portion and the lead portion with the element body. Since a sufficient space is formed in front of the element body for disposing the wire connecting portion, there is no need to expand the element body outward (forward) to ensure the space, and it is possible to reduce a size of the coil device.

Preferably, the coil is made of a flat wire. By adopting such a configuration, a relatively large current can flow through the coil, deformation of the coil is unlikely to occur, and a high-quality coil device can be obtained.

DETAILED DESCRIPTION OF THE PREFERRED EMBODIMENTS

Figure 1:
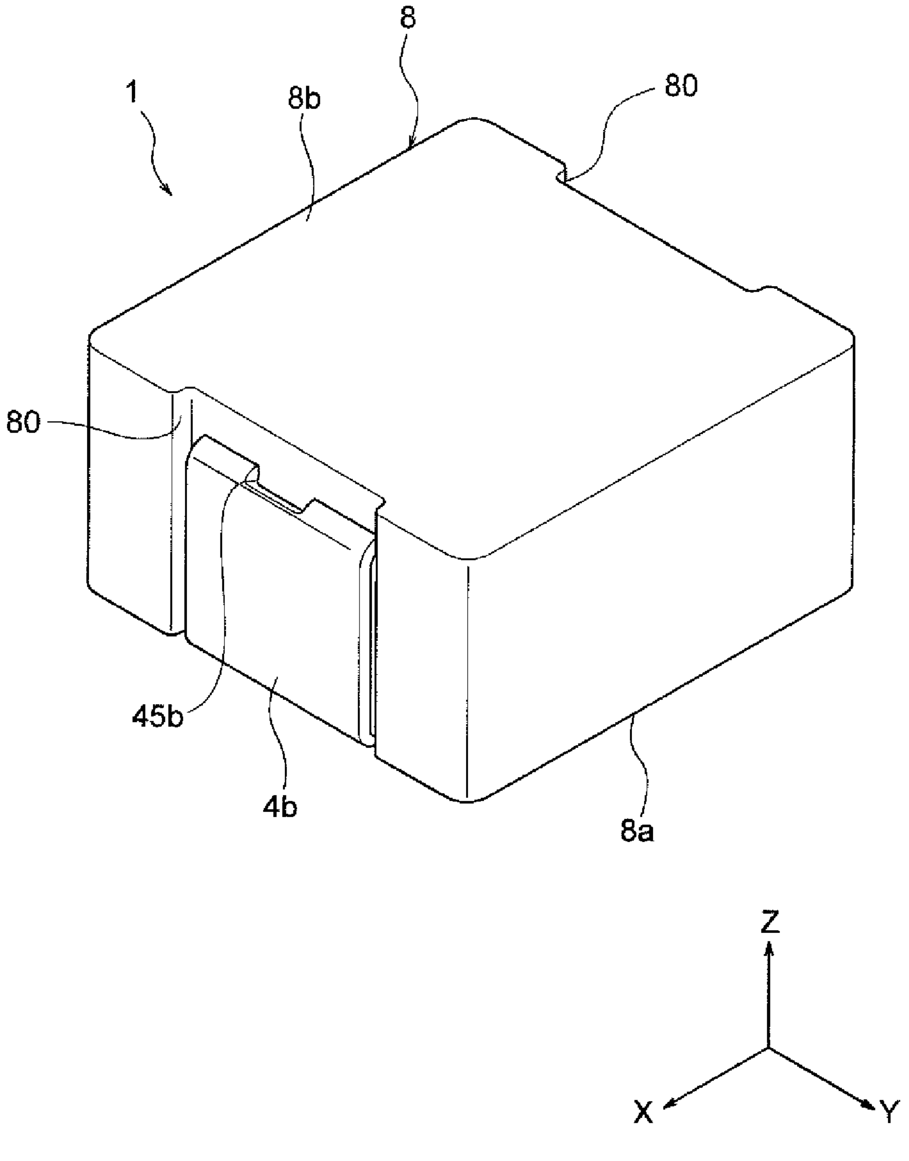
FIG. 1 is a perspective view of a coil device according to a first embodiment of the present invention.

Hereinafter, the present invention will be described based on embodiments shown in the drawings.

First Embodiment

As shown in FIG. 1, an inductor 1 according to a first embodiment of the present invention is a surface-mounted inductor and has a substantially rectangular parallelepiped shape. In FIG. 1, a surface of the inductor 1 on a negative side of a Z-axis direction is a mounting surface 8*a*, which is disposed facing a circuit board or the like. Hereinafter, a surface of the inductor 1 that is opposite to the mounting surface 8*a* is referred to as a non-mounting surface 8*b*. In the drawing, an X-axis direction corresponds to a left-right direction of a core 8, an Y-axis direction corresponds to a front-rear direction of the core 8, and the Z-axis direction corresponds to an up-down direction of the core 8.

Figure 2:
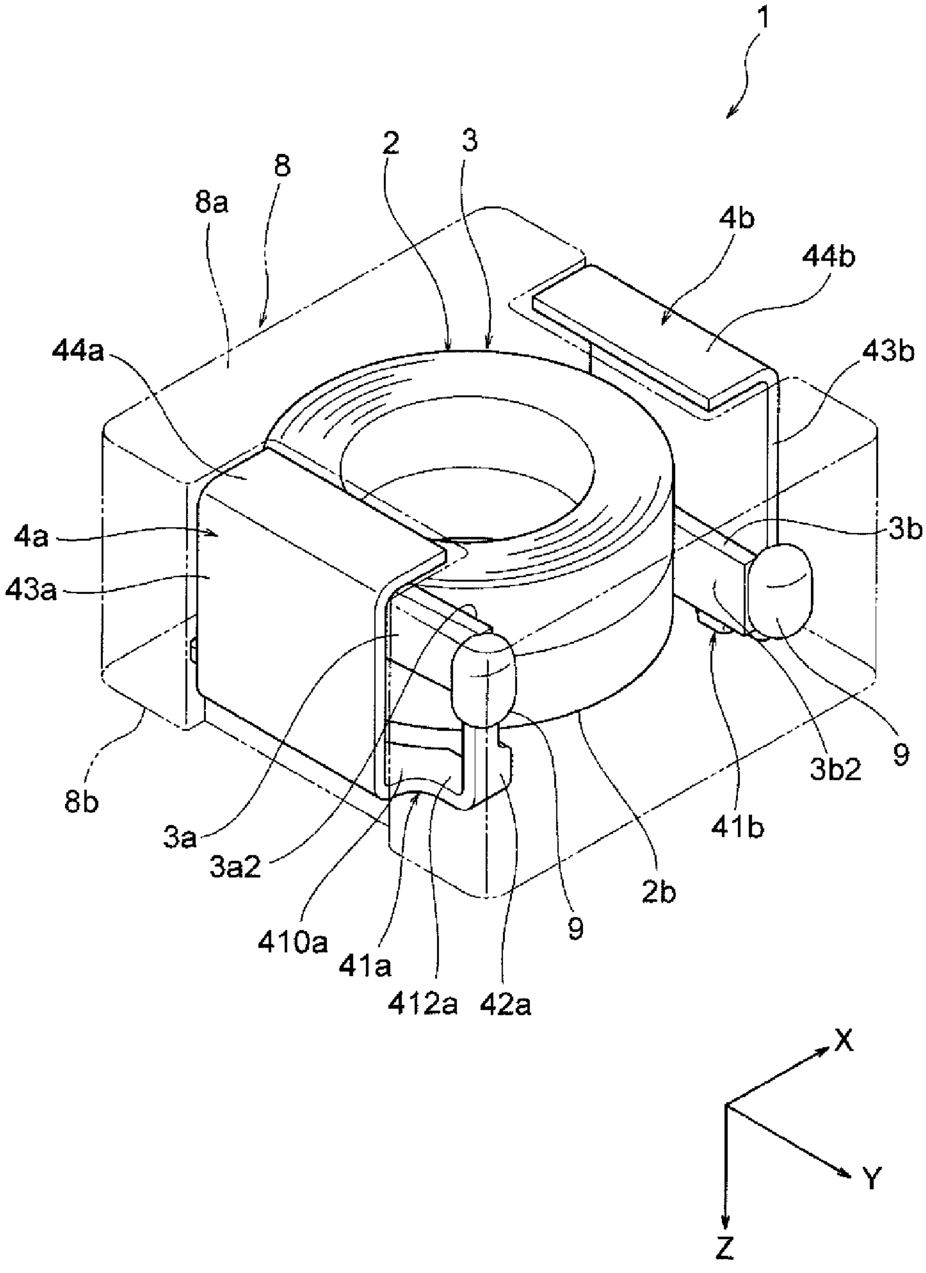
FIG. 2 is a perspective view showing an internal configuration of the coil device shown in FIG. 1.

As shown in FIG. 2, the inductor 1 includes a coil 2, a pair of terminals 4*a*, 4*b*, and the core (element body) 8. Note that FIG. 2 shows a state in which the inductor 1 shown in FIG. 1 is inverted in the up-down direction and the left-right direction. Therefore, the mounting surface 8*a* of the inductor 1 is disposed on an upper side of a paper surface, and the non-mounting surface 8*b* of the inductor 1 is disposed on a lower side of the paper surface.

In the following description, for ease of understanding, the upper side of the paper surface (the negative side of the Z-axis direction in FIG. 2) is defined as an upper side of the inductor 1, and the lower side of the paper surface (a positive side of the Z-axis direction in FIG. 2) is defined as a lower side of the inductor 1. A front side of the paper surface (a positive side of the Y-axis direction in FIG. 2) is defined as a front side of the inductor 1, and a back side of the paper surface (a negative side of the Y-axis direction in FIG. 2) is defined as a rear side of the inductor 1. A direction away from a center of the core 8 or the coil 2 is defined as outside, and a direction toward the center of the core 8 or the coil 2 is defined as inside.

Although dimensions of the inductor 1 are not particularly limited, a width thereof in the X-axis direction is preferably 2 to 20 mm, a width thereof in the Y-axis direction is preferably 2 to 20 mm, and a width thereof in the Z-axis direction is preferably 1 to 10 mm.

Figure 7A:
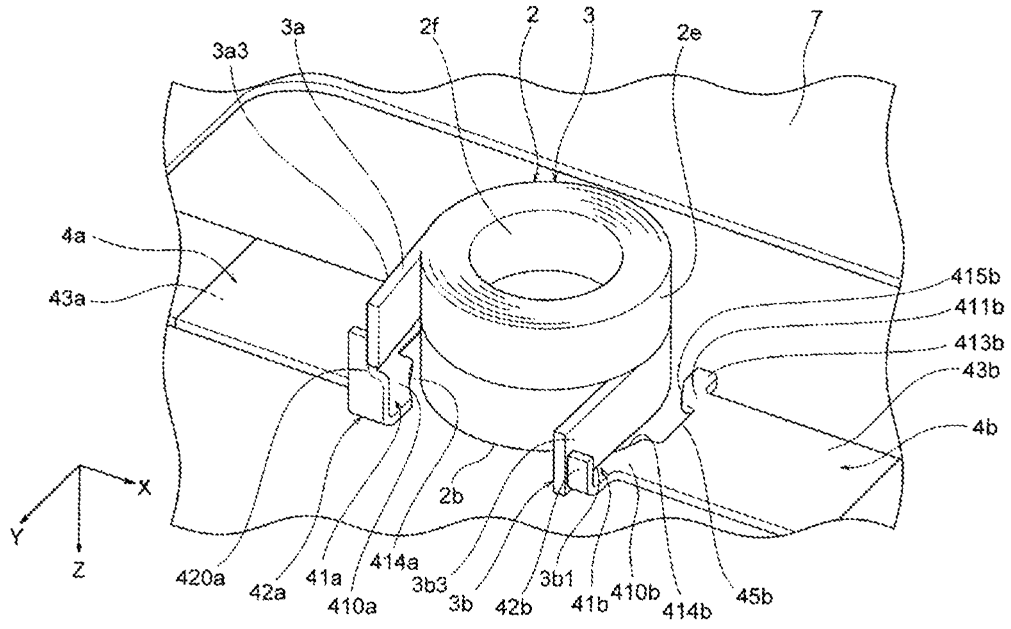
FIG. 7A is a diagram showing a method for manufacturing the coil device shown in FIG. 1.
Figure 7B:
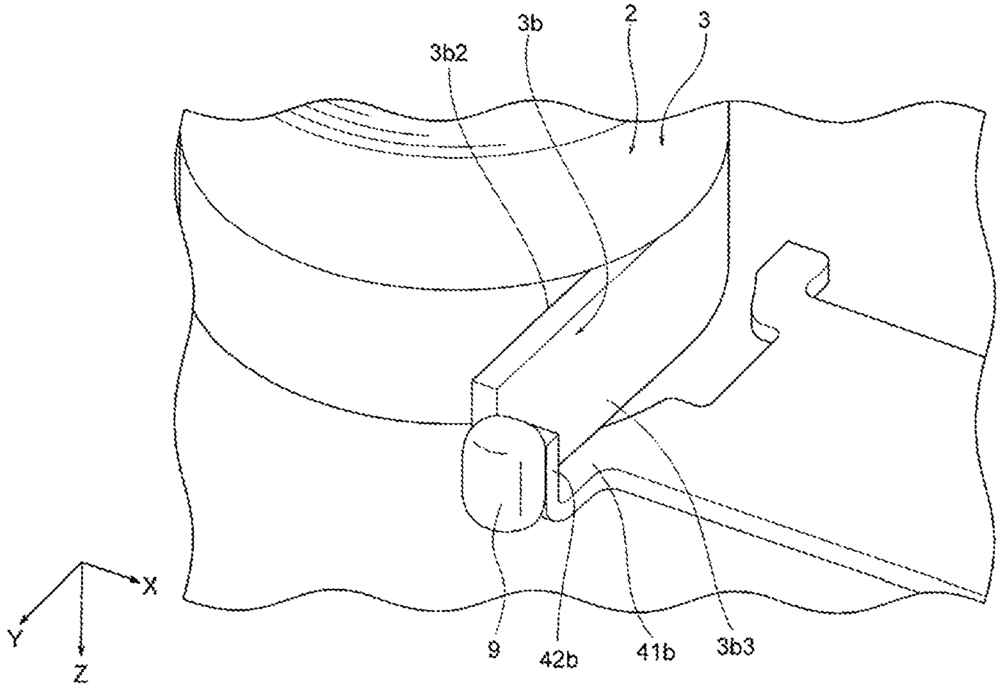
FIG. 7B is a diagram showing a step subsequent to FIG. 7A.
Figure 7C:
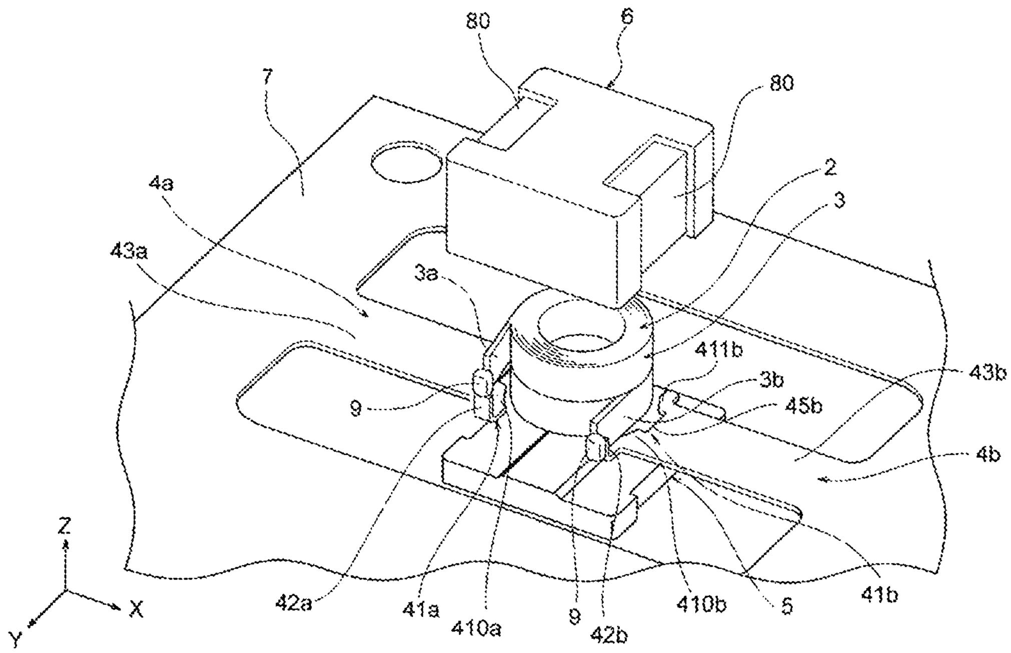
FIG. 7C is a diagram showing a step subsequent to FIG. 7B.

The core 8 is made of a mixture containing magnetic powder and binder resin, and is formed by combining a first core 5 and a second core 6 shown in FIG. 7C. That is, the core 8 is formed by compression-molding the previously molded first core 5 and second core 6 inside a mold and integrating the first core 5 and the second core 6. Note that a boundary between the first core 5 and the second core 6 cannot be identified, and the first core 5 and the second core 6 are completely integrated together.

The core 8 (the first core 5 and/or the second core 6) is made of synthetic resin in which ferrite particles or metal magnetic particles are dispersed. However, a material constituting the core 8 is not limited thereto, and the core 8 may be constituted by a synthetic resin that does not contain these particles. Examples of the ferrite particles include Ni—Zn ferrite and Mn—Zn ferrite. The metal magnetic particles are not particularly limited, and examples thereof include Fe—Ni alloy powder, Fe—Si alloy powder, Fe—Si—Cr alloy powder, Fe—Co alloy powder, Fe—Si—Al alloy powder, and amorphous iron.

The synthetic resin contained in the core 8 is not particularly limited, and preferable examples thereof include epoxy resin, phenol resin, polyester resin, polyurethane resin, polyimide resin, and silicone resin.

Figure 3:
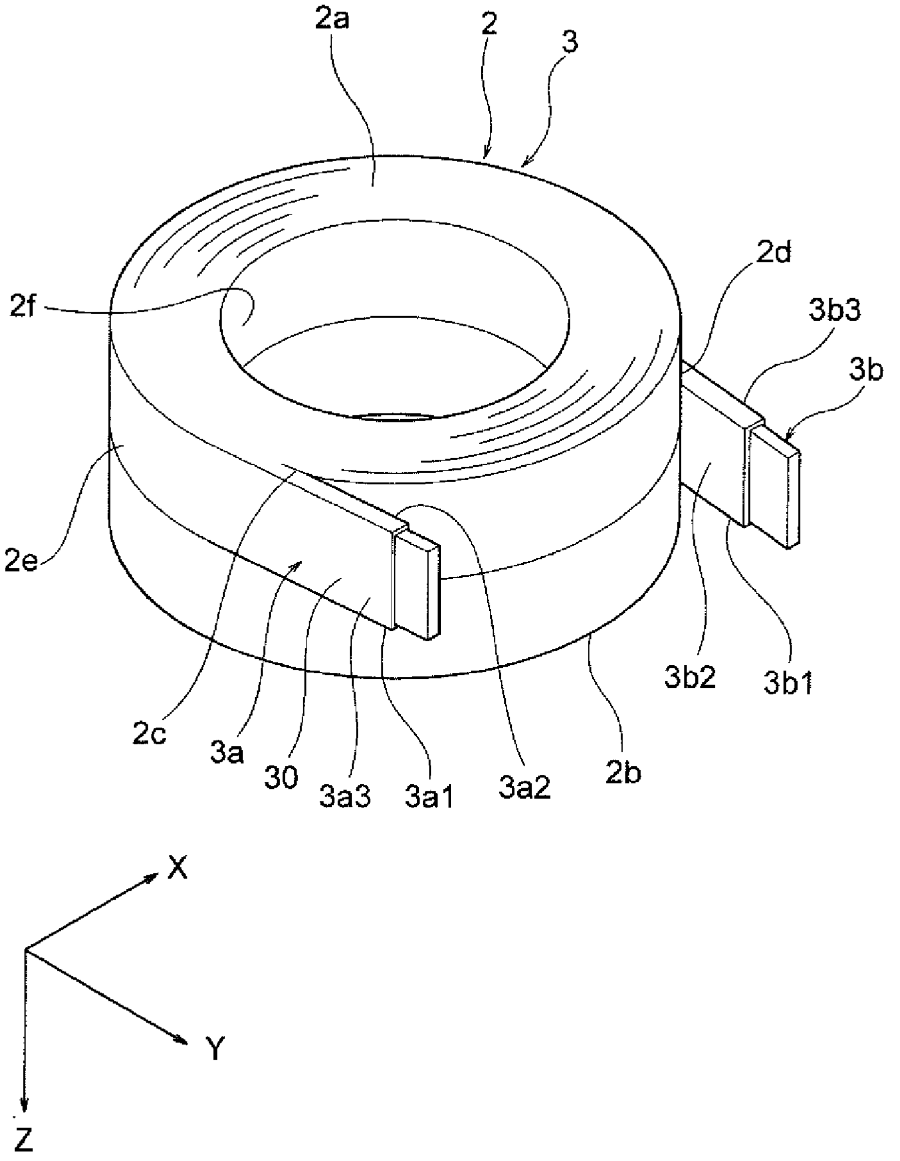
FIG. 3 is a perspective view of a coil shown in FIG. 2.

As shown in FIG. 3, the coil 2 is a flatwise coil. The coil 2 is formed by, for example, α-winding a wire 3 made of a flat wire, and includes two layers along the Z-axis direction. By forming the coil 2 with a flat wire, a relatively large current can flow through the coil 2, deformation of the coil 2 is unlikely to occur, and a high-quality inductor 1 can be obtained. Note that a winding method of the wire 3 is not limited to the a winding, and may be changed as appropriate.

A winding axis direction of the coil 2 corresponds to the Z-axis direction. The wire 3 is wound such that two relatively wide surfaces among four side surfaces constituting an outer surface of the flat wire face inner and outer peripheral sides of the coil 2. Note that the wire 3 may be wound such that two relatively narrow surfaces among the four side surfaces constituting the outer surface of the flat wire face the inner and outer peripheral sides of the coil 2, so as to form the coil 2, which is an edgewise coil.

The coil 2 is an air-cored coil, and as shown in FIG. 2, the coil 2 is embedded inside the core 8. The coil 2 is disposed inside the core 8 such that a thickness direction of lead portions 3*a*, 3*b* substantially coincides with the X-axis direction (the left-right direction of the core 8).

Examples of a material constituting the wire 3 include a good conductor of metal such as copper, copper alloys, silver, and nickel, but the material is not particularly limited as long as it is a conductive material. The wire 3 is an insulated coated wire, and an insulation coating 30 is formed on a surface of the wire 3. Resin constituting the insulation coating 30 is not particularly limited, but for example, a polyamide-imide resin, a urethane resin, or the like is used. As the wire 3, a self-welding wire including a welding coating outside the insulation coating may be used. Although the resin constituting the welding coating is not particularly limited, for example, a polyamide resin, an epoxy resin, or the like is used. The insulation coating 30 is removed from the wire 3 at positions of the lead portions 3*a*, 3*b* in order to establish electrical connection with the terminals 4*a*, 4*b*.

As shown in FIG. 3, in a second layer of the coil 2, the lead portion 3*a* of the wire 3 is led out of the coil 2 from a first lead-out position 2*c* positioned on an outer peripheral surface 2*e* of the coil 2 and extends along the Y-axis direction linearly. In a first layer of the coil 2, the lead portion 3*b* of the wire 3 is led out of the coil 2 from a second lead-out position 2*d* positioned on the outer peripheral surface 2*e* of the coil 2 and extends along the Y-axis direction linearly. The lead portions 3*a*, 3*b* are led out in the same direction (Y-axis direction) without being twisted or bent. The first lead-out position 2*c* and the second lead-out position 2*d* are displaced along the Z-axis direction, and the lead portions 3*a*, 3*b* are displaced along the Z-axis direction.

In the state shown in FIG. 3, the lead portions 3*a*, 3*b* are led out along the Y-axis direction, but when connected to the wire connecting portions 42*a*, 42*b*, the lead portions 3*a*, 3*b* are inclined inwardly with respect to the Y-axis.

Figure 4:
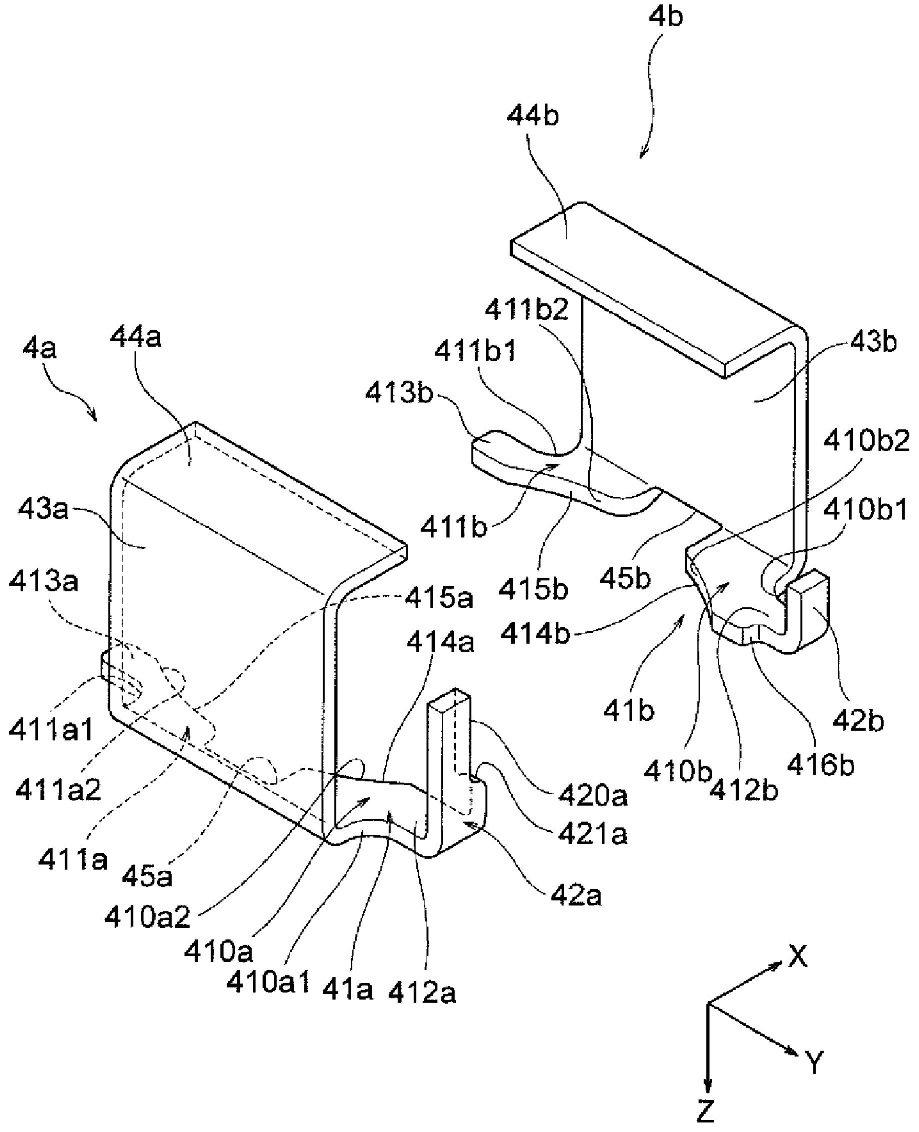
FIG. 4 is a perspective view of a pair of terminals shown in FIG. 2.

As shown in FIG. 4, the terminal 4*a* includes a base portion 41*a*, a wire connecting portion 42*a*, a connecting portion 43*a*, and a mounting portion 44*a*. The terminal 4*b* includes a base portion 41*b*, a wire connecting portion 42*b*, a connecting portion 43*b*, and a mounting portion 44*b*. The terminals 4*a*, 4*b* are formed by machining a conductive plate material such as metal.

Figure 5A:
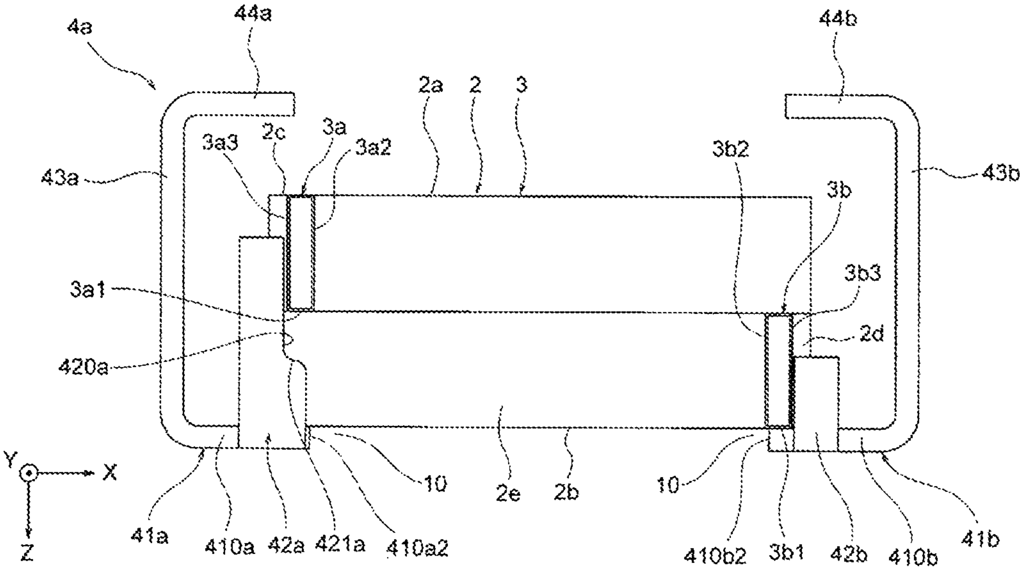
FIG. 5A is a side view showing a state in which a lead portion of the coil is connected to the pair of terminals shown in FIG. 4.

As shown in FIG. 5A, the base portions 41*a* and 41*b* are positioned at substantially the same height as a bottom surface 2*b* of the coil 2 and are arranged substantially parallel to the bottom surface (non-mounting surface 8*b*) of the core 8 shown in FIG. 2. In the present embodiment, upper surfaces of the base portions 41*a*, 41*b* and the bottom surface 2*b* of the coil 2 are positioned substantially on the same plane. The wire connecting portions 42*a*, 42*b* are formed integrally with the base portions 41*a*, 41*b*, and the base portions 41*a*, 41*b* exert an effect of holding the wire connecting portions 42*a*, 42*b*.

As shown in FIG. 4, the base portion 41*a* includes a main branch portion 410*a* and a sub branch portion 411*a*, and the base portion 41*b* includes a main branch portion 410*b* and a sub branch portion 411*b*. The base portions 41*a*, 41*b* both have a bifurcated shape and have a common shape except for a part. Since description of the base portion 41*a* (the main branch portion 410*a* and the sub branch portion 411*a*) is also applicable to the base portion 41*b* (the main branch portion 410*b* and the sub branch portion 411*b*), only particularly necessary matters will be explained for the latter.

The wire connecting portion 42*a* is connected to an end portion of the main branch portion 410*a* (more specifically, a main protruding portion 412*a*, which will be described later) on the positive side of the Y-axis direction, and the main branch portion 410*a* holds the wire connecting portion 42*a*. End portions of the main branch portion 410*a* and the sub branch portion 411*a* on the negative side of the X-axis direction are both connected to a lower end portion of the connecting portion 43*a*. The main branch portion 410*a* extends further outward in the Y-axis direction than an end portion of the connecting portion 43*a* on the positive side of the Y-axis direction, and the sub branch portion 411*a* extends further outward in the Y-axis direction than an end portion of the connecting portion 43*a* on the negative side of the Y-axis direction.

A groove portion 45*a* is formed between the main branch portion 410*a* and the sub branch portion 411*a*. The groove portion 45*a* forms a gap between the main branch portion 410*a* and the sub branch portion 411*a* so that the base portion 41*a* has a bifurcated shape.

The main branch portion 410*a* is positioned on the positive side of the Y-axis direction of the groove portion 45*a*, and the sub branch portion 411*a* is positioned on the negative side of the Y-axis direction of the groove portion 45*a*. Each of the main branch portion 410*a* and the sub branch portion 411*a* is bent in a substantially L shape as a whole. That is, the main branch portion 410*a* extends inward in the X-axis direction from a lower end portion of the connecting portion 43*a*, turns to the Y-axis direction, and extends toward the positive side of the Y-axis direction. The sub branch portion 411*a* extends inward in the X-axis direction from the lower end portion of the connecting portion 43*a*, turns to the Y-axis direction, and extends toward the negative side of the Y-axis direction.

Figure 6:
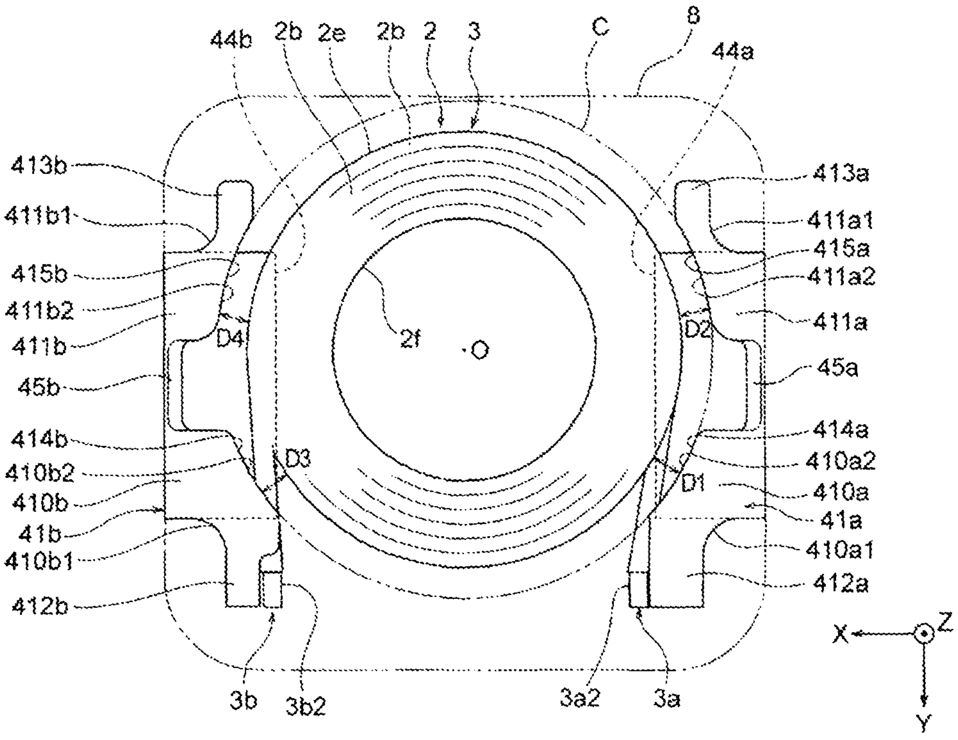
FIG. 6 is a plan view showing a state of the coil device shown in FIG. 2 when viewed from a bottom surface.

As shown in FIG. 6, inside the core 8, the main branch portion 410*a* and the sub branch portion 411*a* extend away from each other. That is, the main branch portion 410*a* extends so as to bend forward from a side of the core 8. The sub branch portion 411*a* extends so as to bend rearward from a side of the core 8. Note that the core 8 covers the coil 2 together with the wire connecting portion 42*a* and the base portion 41*a* (the main branch portion 410*a* and the sub branch portion 411*a*).

An outer edge 410*a*1 of the main branch portion 410*a* is smoothly curved forward from the side of the core 8 in line with an overall shape of the main branch portion 410*a*. An outer edge 411*a*1 of the sub branch portion 411*a* is smoothly curved rearward from the side of the core 8 in line with an overall shape of the sub branch portion 411*a*. A radius of curvature R1 of the outer edge 410*a*1 of the main branch portion 410*a* is different from a radius of curvature R2 of the outer edge 411*a*1 of the sub branch portion 411*a*. In the present embodiment, R1>R2, but R1<R2 is also possible.

By curving the outer edge 410*a*1 of the main branch portion 410*a* and the outer edge 411*a*1 of the sub branch portion 411*a*, the terminal 4*a* can be prevented from coming off from the core 8 and displacement of the base portion 41*a* in the core 8 can be prevented particularly in the left-right direction of the core 8 by an anchoring effect of the main branch portion 410*a* and the sub branch portion 411*a*. By making the radius of curvature of the outer edge 410*a*1 of the main branch portion 410*a* different from the radius of curvature of the outer edge 411*a*1 of the sub branch portion 411*a*, the main branch portion 410*a* and the sub branch portion 411*a* may be provided with a sufficient size to achieve the above effect, so that the above effect can be effectively obtained.

The main branch portion 410*a* includes the main protruding portion 412*a* that protrudes (extends) forward of the core 8. The sub branch portion 411*a* includes a sub protruding portion 413*a* that protrudes (extends) rearward of the core 8. The main branch portion 410*b* includes a main protruding portion 412*b* that protrudes forward of the core 8. The sub branch portion 411*b* includes a sub protruding portion 413*b* that protrudes rearward of the core 8.

The main protruding portion 412*a* is formed narrower than other portions of the main branch portion 410*a*, and the sub protruding portion 413*a* is formed narrower than other portions of the sub branch portion 411*a*. The sub branch portion 411*a* is formed narrower in the X-axis direction than the main branch portion 410*a*.

The main protruding portion 412*a* protrudes forward of the core 8 from the outer peripheral surface 2*e* of the coil 2 along the Y-axis direction. On the other hand, the sub protruding portion 413*a* protrudes rearward of the core 8 from an inner peripheral surface 2*f* of the coil 2 along the Y-axis direction, while does not protrude rearward of the core 8 from the outer peripheral surface 2*e* of the coil 2. That is, an end portion of the sub protruding portion 413*a* in the Y-axis direction is disposed between the inner peripheral surface 2*f* and the outer peripheral surface 2*e* of the coil 2 in the Y-axis direction.

One of the main protruding portion 412*a* and the sub protruding portion 413*a* is displaced with respect to the other along the X-axis direction of the core 8. In the present embodiment, the sub protruding portion 413*a* is displaced to the outside of the core 8 in the X-axis direction with respect to the main protruding portion 412*a*. That is, an inner edge of the sub protruding portion 413*a* is positioned more outside the core 8 than an inner edge of the main protruding portion 412*a*, and an outer edge of the sub protruding portion 413*a* is positioned more outside the core 8 than an outer edge of the main protruding portion 412*a*.

By providing the base portion 41*a* with the main protruding portion 412*a* and the sub protruding portion 413*a*, the terminal 4*a* can be prevented from coming off from the core 8 and displacement of the base portion 41*a* in the core 8 can be prevented particularly in the left-right direction of the core 8 by an anchoring effect of the main protruding portion 412*a* and the sub protruding portion 413*a*. By displacing one of the main protruding portion 412*a* and the sub protruding portion 413*a* relative to the other along the left-right direction of the core 8, an area occupied by the main protruding portion 412*a* and the sub protruding portion 413*a* inside the core 8 can be sufficiently ensured, so that the above effect can be effectively obtained.

As shown in FIG. 4, a main curved portion 414*a* is formed on an inner edge 410*a*2 of the main branch portion 410*a*, and a sub curved portion 415*a* is formed on an inner edge 411*a*2 of the sub branch portion 411*a*. A main curved portion 414*b* is formed on an inner edge 410*b*2 of the main branch portion 410*b*, and a sub curved portion 415*b* is formed on an inner edge 411*b*2 of the sub branch portion 411*b*.

The main curved portions 414*a*, 414*b* are mainly formed on parts of the main branch portions 410*a*, 410*b* excluding the main protruding portions 412*a*, 412*b*. The sub curved portions 415*a*, 415*b* are mainly formed on parts of the sub branch portions 411*a*, 411*b* excluding the sub protruding portions 413*a*, 413*b*.

A radius of curvature of the main curved portion 414*a*, a radius of curvature of the sub curved portion 415*a*, a radius of curvature of the main curved portion 414*b*, and a radius of curvature of the sub curved portion 415*b* are substantially equal to each other. These radiuses of curvature are approximately equal to a radius of curvature of an outer periphery (outer peripheral surface 2*e*) or an inner periphery (inner peripheral surface 2*f*) of the coil 2. Therefore, the main curved portions 414*a*, 414*b* and the sub curved portions 415*a*, 415*b* are curved along the outer peripheral surface 2*e* of the coil 2 at positions spaced from the outer peripheral surface 2*e* of the coil 2 by a predetermined distance.

As shown in FIG. 6, the inner edge 410*a*2 of the main branch portion 410*a* faces the outer peripheral surface 2*e* of the coil 2 with a predetermined gap D1 therebetween. The inner edge 411*a*2 of the sub branch portion 411*a* faces the outer peripheral surface 2*e* of the coil 2 with a predetermined gap D2 therebetween. The inner edge 410*b*2 of the main branch portion 410*b* faces the outer peripheral surface 2*e* of the coil 2 with a predetermined gap D3 therebetween. The inner edge 411*b*2 of the sub branch portion 411*b* faces the outer peripheral surface 2*e* of the coil 2 with a predetermined gap D4 therebetween. That is, none of the main branch portions 410*a*, 410*b* and the sub branch portions 411*a*, 411*b* are in contact with the coil 2, and are arranged around the outer peripheral surface 2*e* of the coil 2 so as to surround the outer peripheral surface 2*e* of the coil 2. In the present embodiment, the distance D1, the distance D2, the distance D3, and the distance D4 are substantially equal to each other on a virtual plane parallel to the bottom surface 2*b* of the coil 2 and the upper surfaces of the base portions 41*a*, 41*b*.

A center position of a virtual circle C defined by the main curved portion 414*a*, the sub curved portion 415*a*, the main curved portion 414*b*, and the sub curved portion 415*b* approximately coincides with a center position of the inner periphery (inner peripheral surface 2*f*) or the outer periphery (outer peripheral surface 2*e*) of the coil 2. That is, the virtual circle C and a virtual circle defined by the inner periphery (inner peripheral surface 2*f*) or the outer periphery (outer peripheral surface 2*e*) of the coil 2 are arranged concentrically.

As shown in FIG. 5A, the inner edge 410*a*2 of the main branch portion 410*a* is positioned outside an inner side surface 3*a*2 of the lead portion 3*a* in the X-axis direction. Although detailed illustration is omitted, the inner edge 411*a*2 (FIG. 4) of the sub branch portion 411*a* is similarly positioned outside the inner side surface 3*a*2 of the lead portion 3*a* in the X-axis direction. That is, the main branch portion 410*a* and the sub branch portion 411*a* do not protrude inwardly beyond the inner side surface 3*a*2 of the lead portion 3*a*.

The inner edge 410*b*2 of the main branch portion 410*b* is positioned outside an inner side surface 3*b*2 of the lead portion 3*b* in the X-axis direction. Although detailed illustration is omitted, the inner edge 411*b*2 (FIG. 4) of the sub branch portion 411*b* is similarly positioned outside the inner side surface 3*b*2 of the lead portion 3*b* in the X-axis direction. That is, the main branch portion 410*b* and the sub branch portion 411*b* do not protrude inwardly beyond the inner side surface 3*b*2 of the lead portion 3*b*.

A lead bottom portion 3*b*1 of the lead portion 3*b* led from a lower part (second lead-out position 2*d*) of the coil 2 is placed on an upper surface of the main branch portion 410*b* between the main branch portion 410*a* and the main branch portion 410*b*. As a result, the lead portion 3*b* is fixed to the main branch portion 410*b*, and during manufacture of the inductor 1 (during compression molding of the first core 5 and the second core 6 shown in FIG. 7C), positional displacement of the lead portion 3*b* (and the whole coil 2) due to applied pressure can be effectively prevented. Note that since the lead portion 3*a* of the wire 3 is led out from an upper part (first lead-out position 2*c*) of the coil 2, the lead portion 3*a* is not placed on an upper surface of the main branch portion 410*a*, and is disposed at a position spaced upward from the upper surface of the main branch portion 410*a*.

As shown in FIG. 4, only the main branch portion 410*b* between the main branch portion 410*a* and the main branch portion 410*b* is formed with a recess 416*b*. The recess 416*b* is formed on the inner edge 410*b*2 of the main branch portion 410*b*, and is positioned at a different position from the main curved portion 414*b* (forward than the main curved portion 414*b*). The recess 416*b* is provided to adjust (narrow) a width of the main protruding portion 412*b* and further of the wire connecting portion 42*b* in the X-axis direction.

Figure 5B:
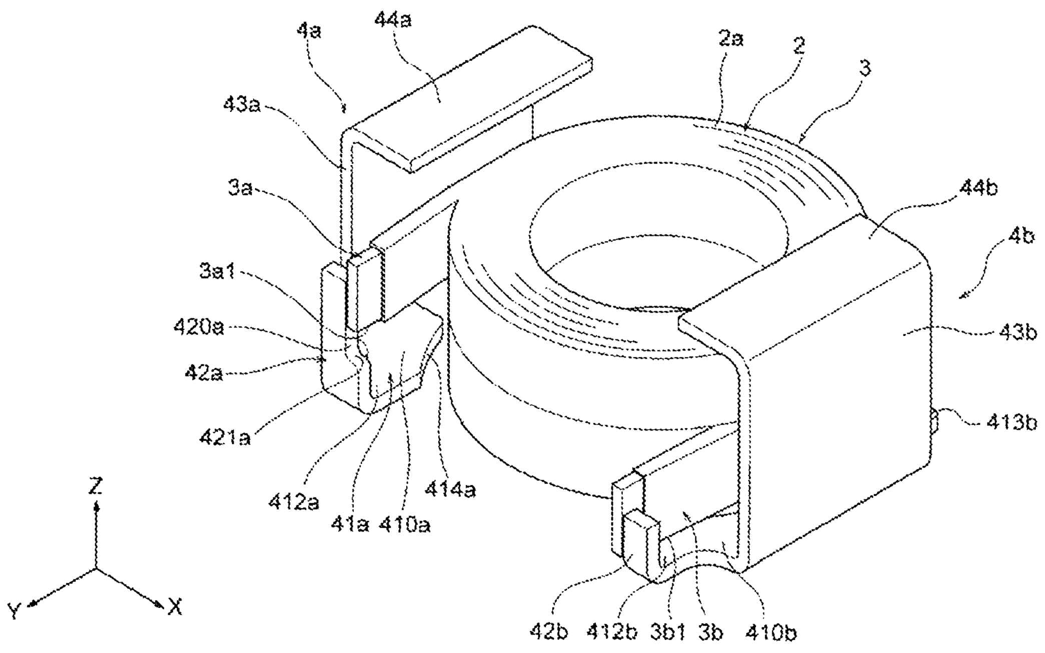
FIG. 5B is a perspective view showing a state of the pair of terminals and the coil shown in FIG. 5A when viewed from another angle.

The wire connecting portions 42*a*, 42*b* have a flat plate shape substantially parallel to an XZ plane, and are arranged substantially orthogonal to the lead portions 3*a*, 3*b* (see FIG. 5B). As shown in FIG. 2, the wire connecting portions 42*a*, 42*b* are arranged inside the core 8. The lead portions 3*a*, 3*b* of the wire 3 are connected to the wire connecting portions 42*a*, 42*b*. More specifically, the lead portion 3*a* is connected to the wire connecting portion 42*a* at a position spaced upward from the upper surface of the base portion 41*a*. The lead portion 3*b* is connected to the wire connecting portion 42*b* while being placed on the base portion 41*b*. In the present embodiment, since the lead portions 3*a* and 3*b* are led out in substantially the same direction (positive side of the Y-axis direction), the wire connecting portions 42*a*, 42*b* are arranged on the positive side of the Y-axis direction of the coil 2 from which the lead portions 3*a*, 3*b* are led out.

As shown in FIG. 4, the wire connecting portions 42*a*, 42*b* extend along the Z-axis direction and rise upward from the end portions on the positive side of the Y-axis direction of the main branch portions 410*a*, 410*b*. The wire connecting portions 42*a*, 42*b* are arranged substantially perpendicular to the main branch portions 410*a*, 410*b*. Rising positions of the wire connecting portions 42*a*, 42*b* are positioned forward of positions of the end portions of the connecting portions 43*a*, 43*b* on the positive side of the Y-axis direction. As shown in FIG. 2, the end portions of the base portions 41*a*, 41*b* on the positive side of the Y-axis direction are arranged outside the end portion of the coil 2 on the positive side of the Y-axis direction in the Y-axis direction, and therefore, the rising positions of the wire connecting portions 42*a*, 42*b* are positioned outside the end portion of the coil 2 on the positive side of the Y-axis direction in the Y-axis direction.

As shown in FIG. 5A, a length of the wire connecting portion 42*a* in the Z-axis direction is longer than a length of the wire connecting portion 42*b* in the Z-axis direction. The length of the wire connecting portion 42*a* in the Z-axis direction is longer than a length of the wire 3 in the Z-axis direction, and an upper end portion of the wire connecting portion 42*a* is disposed at a position corresponding to the second layer of the coil 2 (first lead-out position 2*c*). Therefore, when the lead portion 3*a* is led out from the first lead-out position 2*c*, the lead portion 3*a* can be led out to the position of the wire connecting portion 42*a* and connected thereto without being bent unnecessarily.

The length of the wire connecting portion 42*b* in the Z-axis direction is smaller than the length of the wire 3 in the Z-axis direction, and the upper end portion of the wire connecting portion 42*b* is disposed at a position corresponding to the first layer of the coil 2 (second lead-out position 2*d*). Therefore, the position of the upper end portion of the wire connecting portion 42*a* and the position of the upper end portion of the wire connecting portion 42*b* are displaced from each other along the Z-axis direction.

In this way, since the positions (heights) of the wire connecting portions 42*a*, 42*b* are adjusted to match positions (heights) of the lead-out positions 2*c*, 2*d*, the lead portions 3*a*, 3*b* can be led out to the positions of the wire connecting portions 42*a*, 42*b* and connected thereto without being bent unnecessarily.

As shown in FIG. 6, a position of a center O of the coil 2 is displaced along the Y-axis direction from a center of the core 8 to a side opposite to the wire connecting portions 42*a*, 42*b* (to a rear side of the core 8). By adopting such a configuration, it is possible to ensure a sufficient volume of the core 8 in front of the core 8. Therefore, the wire connecting portions 42*a*, 42*b* and the lead portions 3*a*, 3*b* connected thereto can be covered with a sufficient amount of the core 8 to protect the wire connecting portions 42*a*, 42*b* and the lead portions 3*a*, 3*b*. Since a sufficient space is formed in front of the core 8 for arranging the wire connecting portions 42*a*, 42*b*, there is no need to expand the core 8 forward to ensure the space, and the inductor 1 can be miniaturized.

It is possible to dispose the outer peripheral surface 2*e* of the coil 2 at a position sufficiently spaced from a side surface of the core 8 on the positive side of the Y-axis direction, ensure a sufficient thickness of the core 8 between the outer peripheral surface 2*e* of the coil 2 and the side surface of the core 8 on the positive side of the Y-axis direction, and prevent cracks from occurring on the side surface of the core 8 on the positive side of the Y-axis direction.

As shown in FIG. 5A, when the core 8 is viewed from a front side, at least a part of the lead portion 3*a* is positioned inside in the X-axis direction of the first lead-out position 2*c* on the outer peripheral surface 2*e* of the coil 2 where the lead portion 3*a* is led out. At least a part of the lead portion 3*b* is positioned inside in the X-axis direction of the second lead-out position 2*d* on the outer peripheral surface 2*e* of the coil 2 from which the lead portion 3*b* is led out. By adopting such a configuration, an elastic force that tries to return the lead portion 3*a* to the first lead-out position 2*c* (outside the X-axis direction) acts on the lead portion 3*a*, so that the lead portion 3*a* is fixed to the wire connecting portion 42*a* in a biased state. Similarly, an elastic force that tries to return the lead portion 3*b* to the second lead-out position 2*d* (outside the X-axis direction) acts on the lead portion 3*b*, so that the lead portion 3*b* is fixed to the wire connecting portion 42*b* in a biased state. Therefore, the connection between the lead portion 3*a* and the wire connecting portion 42*a* can be maintained satisfactorily, and the connection between the lead portion 3*b* and the wire connecting portion 42*b* can be maintained satisfactorily.

A notch portion 420*a* is formed along the Z-axis direction in an inner edge of the wire connecting portion 42*a* between the wire connecting portion 42*a* and the wire connecting portion 42*b*. The notch portion 420*a* is cut downward at a predetermined depth from an upper end of the wire connecting portion 42*a*. The lead portion 3*a* of the wire 3 can be fixed to the notch portion 420*a*.

A length of the notch portion 420*a* in the Z-axis direction is substantially the same as the length of the wire 3 in the Z-axis direction. As shown in FIG. 5A, the lead bottom portion 3*a*1 of the lead portion 3*a* is fixed at a position spaced upward from a notch bottom portion 421*a* and does not contact the notch bottom portion 421*a*. Therefore, when the lead portion 3*a* is fixed to the notch portion 420*a*, the upper end portion of the lead portion 3*a* protrudes above the upper end of the wire connecting portion 42*a*, and the lead portion 3*a* is entirely accommodated inside the notch portion 420*a*.

In this way, by fixing the lead portion 3*a* at a position spaced upward from the notch bottom portion 421*a*, even if the first lead-out position 2*c* of the lead portion 3*a* changes along the Z-axis direction, the lead portion 3*a* does not come into contact with the notch bottom portion 421*a*, and the lead portion 3*a* can be reliably fixed to the notch portion 420*a*. When connecting the lead portion 3*a* to the wire connecting portion 42*a*, the lead portion 3*a* can be fixed to the notch portion 420*a* in a state of being straightly led out without being bent.

Note that an upper end portion of the lead portion 3*b* also protrudes above the upper end of the wire connecting portion 42*b*, similarly to the upper end portion of the lead portion 3*a*. This is because the length of the wire connecting portion 42*b* in the Z-axis direction is smaller than the length of the wire 3 in the Z-axis direction due to the miniaturization of the wire connecting portion 42*b*.

An outer side surface 3*a*3 (more specifically, a part or most of the outer side surface 3*a*3) of the lead portion 3*a* is connected to the inner edge of the wire connecting portion 42*a*, and an outer side surface 3*b*3 (more specifically, a part or most of the outer side surface 3*a*3) of the lead portion 3*b* is connected to an inner edge of the wire connecting portion 42*b*. The inner side surface 3*a*2 of the lead portion 3*a* is not fixed to the wire connecting portion 42*a*, and the inner side surface 3*b*2 of the lead portion 3*b* is not fixed to the wire connecting portion 42*b*.

With respect to the X-axis direction, a position of the outer side surface 3*a*3 of the lead portion 3*a* is positioned more inside than a position of the outer peripheral surface 2*e* of the coil 2 at the first lead-out position 2*c*. Therefore, with respect to the X-axis direction, the inner edge of the wire connecting portion 42*a* is positioned between the outer side surface 3*a*3 of the lead portion 3*a* and the outer peripheral surface 2*e* at the first lead-out position 2*c*. With respect to the X-axis direction, the position of the outer side surface 3*b*3 of the lead portion 3*b* is positioned more inside than the position of the outer peripheral surface 2*e* of the coil 2 at the second lead-out position 2*d*. Therefore, the inner edge of the wire connecting portion 42*b* is positioned between the outer side surface 3*b*3 of the lead portion 3*b* and the outer peripheral surface 2*e* at the second lead-out position 2*d* with respect to the X-axis direction.

In the present embodiment, the wire connecting portion 42*a* is positioned biased outward of the lead portion 3*a* that is led out forward of the core 8 in the X-axis direction.

Similarly, the wire connecting portion 42*b* is positioned biased outward of the lead portion 3*b* that is led out forward of the core 8 in the X-axis direction. More specifically, the inner edge of the wire connecting portion 42*a* is positioned outside the inner side surface 3*a*2 of the lead portion 3*a* in the X-axis direction. The inner edge of the wire connecting portion 42*a* is positioned outside the outer side surface 3*a*3 of the lead portion 3*a* in the X-axis direction at the position of the notch portion 420*a*. The inner edge of the wire connecting portion 42*b* is positioned outside the inner side surface 3*b*2 and the outer side surface 3*b*3 of the lead portion 3*b* in the X-axis direction. That is, the wire connecting portions 42*a*, 42*b* do not protrude inward in the X-axis direction beyond the inner side surfaces 3*a*2, 3*b*2 of the lead portions 3*a*, 3*b*, and the entire wire connecting portions 42*a*, 42*b* are arranged outside the inner side surfaces 3*a*2, 3*b*2 in the X-axis direction.

As shown in FIG. 2, the lead portions 3*a*, 3*b* are connected to wire connecting portions 42*a*, 42*b* via a melted portion 9. The melted portion 9 is constituted by a weld bead formed when the terminals 4*a*, 4*b* (the wire connecting portions 42*a*, 42*b*) are irradiated with a laser. Here, the melted portion 9 may be a connection member made of solder, a conductive adhesive, or the like. In the wire connecting portion 42*a*, the melted portion 9 is unevenly distributed outside the inner side surface 3*a*2 of the lead portion 3*a* in the X-axis direction. In the wire connecting portion 42*b*, the melted portion 9 is unevenly distributed outside the inner side surface 3*b*2 of the lead portion 3*b* in the X-axis direction. That is, the melted portion 9 does not substantially protrude (is not formed) inside the inner side surfaces 3*a*2, 3*b*2 of the lead portions 3*a*, 3*b* in the X-axis direction, and the entire melted portion 9 is substantially disposed outside the inner side surfaces 3*a*2, 3*b*2 in the X-axis direction.

As shown in FIG. 4, the connecting portions 43*a*, 43*b* include surfaces substantially parallel to a YZ plane and extend upward from the base portions 41*a*, 41*b*. As shown in FIG. 2, the connecting portions 43*a*, 43*b* are exposed on side surfaces of the core 8 in the X-axis direction at a position spaced upward from the non-mounting surface 8*b* of the core 8, and extend to the position of the mounting surface 8*a* of the core 8 along the side surface. Although not shown in detail, part of the groove portions 45*a*, 45*b* (FIG. 1) extends to the lower end portions of the connecting portions 43*a*, 43*b*, and the groove portions 45*a*, 45*b* are exposed on the side surfaces of the core 8 in the X-axis direction.

As shown in FIG. 4, the mounting portions 44*a*, 44*b* are connected to end portions of the connecting portions 43*a*, 43*b* in the Z-axis direction and extend inward in the X-axis direction. The mounting portions 44*a*, 44*b* include surfaces parallel to an XY plane and are formed along the mounting surface 8*a* of the core 8 shown in FIG. 2. The mounting portions 44*a*, 44*b* are exposed to the outside of the core 8 on the mounting surface 8*a*, and are connected to a circuit board or the like (not shown) when the inductor 1 is mounted.

The mounting portions 44*a*, 44*b* are connected to a circuit board or the like via a connection member such as solder or a conductive adhesive. In this case, solder fillets can be formed in the connecting portions 43*a*, 43*b*, so that a mounting strength of the inductor 1 on the circuit board or the like can be increased.

Next, a method for manufacturing the inductor 1 will be described with reference to FIGS. 7A to 7F and the like. In the method of the present embodiment, first, a conductive plate such as a metal plate (for example, a Sn-plated metal plate) is punched into a shape as shown in FIG. 7A or 7C. As shown in the same drawing, the terminals 4*a*, 4*b* connected to a frame 7 via the connecting portions 43*a*, 43*b* are formed on the conductive plate after punching. In the frame 7, the terminals 4*a* and 4*b* are arranged with a predetermined interval therebetween along the X-axis direction.

Next, as shown in FIG. 7A, the coil 2 is disposed between the terminal 4*a* and the terminal 4*b*. In this case, the coil 2 is disposed at a position spaced from the terminals 4*a*, 4*b* by a predetermined distance (distances D1 to D4 shown in FIG. 6) such that a gap is formed between the main branch portions 410*a*, 410*b* (curved portions 414*a*, 415*a*) and sub branch portions 411*a*, 411*b* (curved portions 414*b*, 415*b*) of the terminals 4*a*, 4*b* and the outer peripheral surface 2*e* of the coil 2. It is preferable to fix the bottom surface 2*b* of the coil 2 on a pedestal (a pedestal having the same thickness as the terminals 4*a*, 4*b*) so that the bottom surface 2*b* of the coil 2 and the upper surfaces of the main branch portions 410*a*, 410*b* and the sub branch portions 411*a*, 411*b* are arranged substantially on the same plane. In order to prevent the coil 2 from being displaced, it is preferable to fix the inner peripheral surface 2*f* of the coil 2 with a positioning pin or the like.

When disposing the coil 2, the outer surface 3*a*3 of the lead portion 3*a* of the wire 3 is fixed to the inner edge (notch portion 420*a*) of the wire connecting portion 42*a*, and the wire connecting portion 42*a* is arranged outside the outer side surface 3*a*3 in the X-axis direction. The outer side surface 3*b*3 of the lead portion 3*b* of the wire 3 is fixed to the inner edge of the wire connecting portion 42*b*, and the wire connecting portion 42*b* is disposed outside the outer side surface 3*b*3 in the X-axis direction. The lead portion 3*b* of the wire 3 is placed on the main branch portion 410*b* so that the lead bottom portion 3*b*1 contacts the upper surface of the main branch portion 410*b*.

Next, as shown in FIG. 7B, the wire connecting portions 42*a*, 42*b* are irradiated with laser to form the melted portion 9 on the wire connecting portions 42*a*, 42*b*. As a result, the lead portions 3*a*, 3*b* are connected to the wire connecting portions 42*a*, 42*b* via the melted portion 9 (see FIG. 2). In the present embodiment, since the lead portions 3*a*, 3*b* are led out to substantially the same direction along the Y-axis direction, laser irradiation can be performed on the lead portions 3*a*, 3*b* from the same direction, thereby facilitating laser welding. Note that the laser irradiation is preferably performed so that the melted portion 9 does not protrude inward in the X-axis direction to the inner side surfaces 3*a*2, 3*b*2 of the lead portions 3*a*, 3*b*.

Figure 7D:
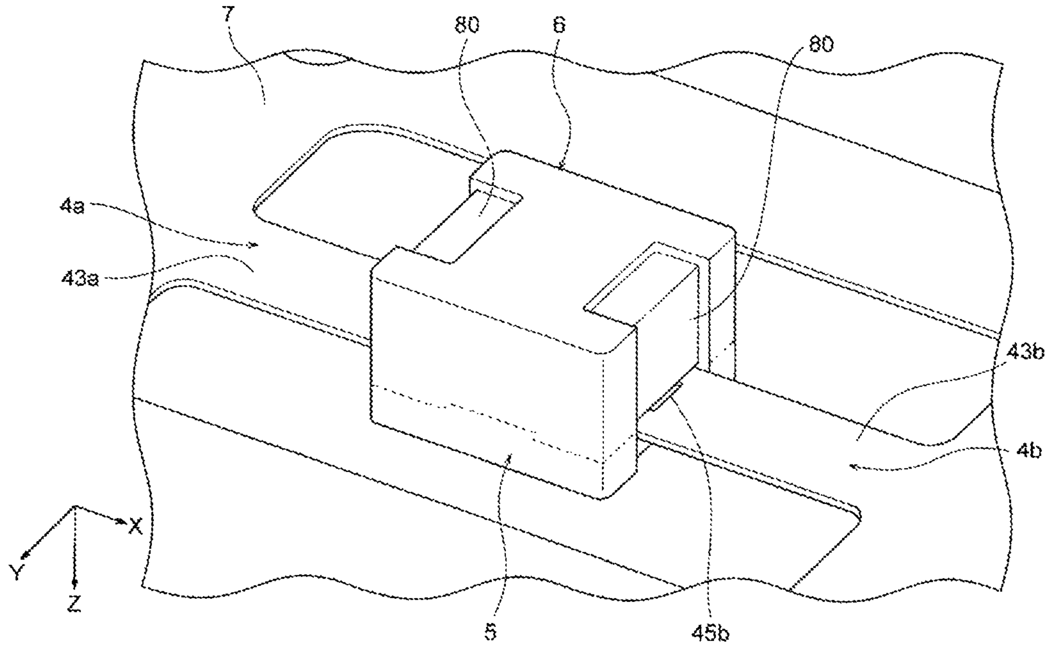
FIG. 7D is a diagram showing a step subsequent to FIG. 7C.

Next, the coil 2 in which the terminals 4*a*, 4*b* are fixed to each end portion respectively is disposed inside the mold, and the coil 2 is combined with the first core 5 and the second core 6 as shown in FIG. 7C to constitute a temporary assembly shown in FIG. 7D. More specifically, the coil 2 and the base portions 41*a*, 41*b* of the terminals 4*a*, 4*b* are placed on an upper surface of the first core 5. The connecting portions 43*a*, 43*b* of the terminals 4*a*, 4*b* are exposed from the first core 5 and the second core 6, respectively. Pre-molded cores (temporary molded cores) are used as the first core 5 and the second core 6. As a material constituting the first core 5 and the second core 6, a fluid material is used, and a composite magnetic material with a thermoplastic resin or a thermosetting resin as a binder is used.

The first core 5 and the second core 6 of the temporary assembly shown in FIG. 7D are compression-molded using mold jigs (upper and lower punches and the like), and by integrating the first core 5 and the second core 6, the core 8 (FIG. 7E) is formed. In this case, by applying heat, the first core 5 and the second core 6 can be easily integrated.

Figure 7E:
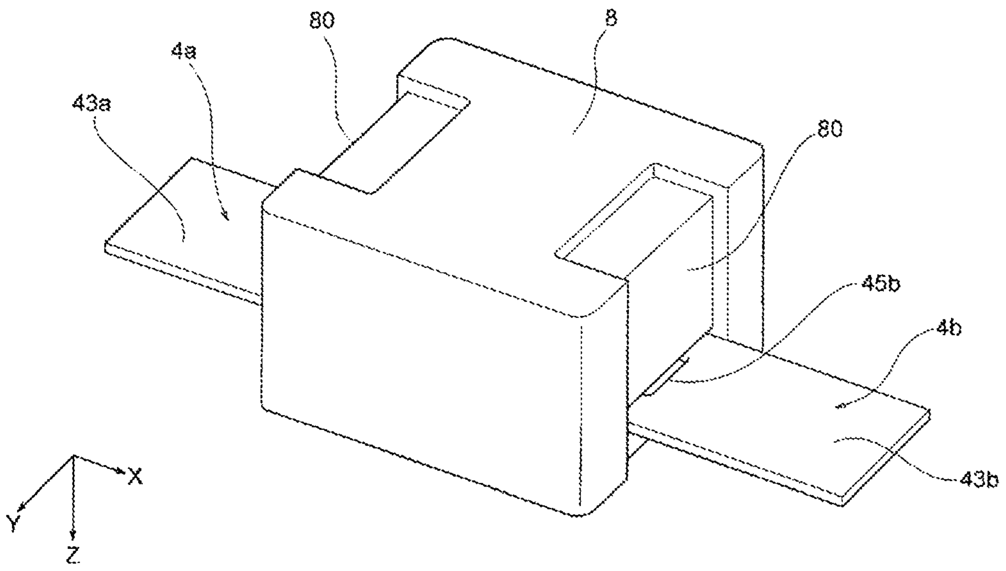
FIG. 7E is a diagram showing a step subsequent to FIG. 7D.
Figure 7F:
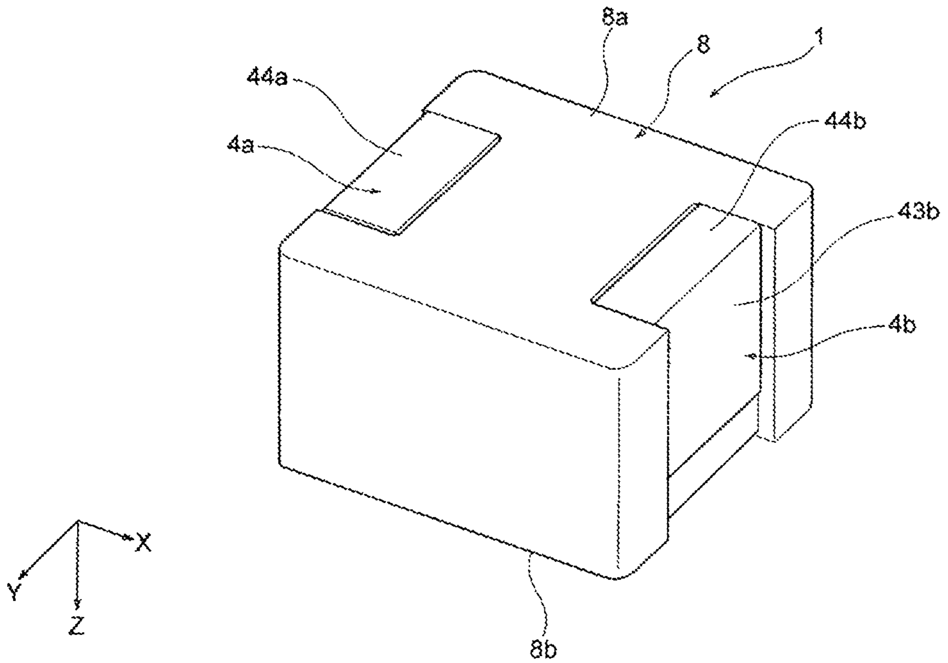
FIG. 7F is a diagram showing a step subsequent to FIG. 7E.

Next, as shown in FIG. 7E, the frame 7 shown in FIG. 7D is cut and removed with a cutting tool so that only the connecting portions 43*a*, 43*b* remain. Then, the connecting portions 43*a*, 43*b* are fixed to side recesses 80 formed in the core 8. More specifically, as shown in FIG. 7F, the connecting portions 43*a*, 43*b* of the terminals 4*a*, 4*b* are bent substantially vertically from the state shown in FIG. 7E, and the connecting portions 43*a*, 43*b* are fixed to the side recesses 80 respectively from sides of the core 8 in the X-axis direction. In this state, the end portions of the connecting portions 43*a*, 43*b* are bent substantially vertically and fixed to end portions of the side recesses 80, respectively, which extend to the mounting surface 8*a* of the core 8. As a result, the mounting portions 44*a*, 44*b* of the terminals 4*a*, 4*b* are formed on the mounting surface 8*a* of the core 8. As described above, the inductor 1 in the present embodiment can be obtained.

As shown in FIG. 5A, in the inductor 1 according to the present invention, since the base portions 41*a*, 41*b* are positioned at substantially the same height as the bottom surface 2*b* of the coil 2, the lead portions 3*a*, 3*b* of the wire 3 can be led out to the position of the wire connecting portions 42*a*, 42*b* and connected thereto without being bent unnecessarily. This point is particularly advantageous in a case where the coil 2 is formed by a flat wire or the like, which is not easy to process. Therefore, it is possible to prevent damage to the lead portions 3*a*, 3*b* and obtain a high-quality inductor 1. Unnecessary processing (bending) of the coil 2 can be avoided, and the number of man-hours can be reduced.

As shown in FIG. 6, the inner edges 410*a*2, 410*b*2 of the main branch portions 410*a*, 410*b* and the inner edges 411*a*2, 411*b*2 of the sub branch portions 411*a*, 411*b* are positioned away from the outer peripheral surface 2*e* of the coil 2, and therefore, there is no physical contact between the main branch portions 410*a*, 410*b* and the sub branch portions 411*a*, 411*b* and the coil 2, and sufficient withstand voltage can be ensured therebetween. Therefore, even if the insulation coating of the coil 2 is damaged, the conductor portion of the coil 2 and the terminals 4*a*, 4*b* do not come into physical contact with each other, thereby preventing the short circuit therebetween. Note that according to an experiment conducted by the present inventor, it is confirmed that it is possible to ensure an impulse breakdown voltage up to 360 V (a measurement limit of a measuring instrument) by setting a positional relation between the terminals 4*a*, 4*b* and the coil 2 as described above. It is also confirmed that a self-resonant frequency (SRF) in a high frequency band can be ensured, good frequency characteristics can be obtained in a wide band from 10 kHz to 5 MHz, and a good Q value can be obtained in the high frequency band.

Since the main curved portions 414*a*, 414*b* of the main branch portions 410*a*, 410*b* and the sub curved portions 415*a*, 415*b* of the sub branch portions 411*a*, 411*b* are curved along the outer peripheral surface 2*e* of the coil 2, it is possible to dispose the main branch portions 410*a*, 410*b*, the sub branch portions 411*a*, 411*b*, and further the wire connecting portions 42*a*, 42*b* relatively close to the outer peripheral surface 2*e* of the coil 2, and it is possible to make the base portions 41*a*, 41*b* or the wire connecting portions 42*a*, 42*b* compact. A volume of the coil 2 can be increased by the amount of compactness of the base portions 41*a*, 41*b* or the wire connecting portions 42*a*, 42*b*, thereby improving inductance characteristics of the inductor 1.

The center position of the virtual circle C defined by the main curved portion 414*a*, the sub curved portion 415*a*, the main curved portion 414*b*, and the sub curved portion 415*b* approximately coincides with a position of a center O of the inner periphery of the coil 2. Therefore, a clearance between the outer peripheral surface 2*e* of the coil 2 and the inner edges of the main branch portions 410*a*, 410*b* and the sub branch portions 411*a*, 411*b* can be made substantially constant. Therefore, it is possible to prevent variations in the inductance characteristics from occurring for each product. It is also possible to prevent local formation of regions with low withstand voltage between the base portions 41*a*, 41*b* and the coil 2, thereby promoting quality improvement of the inductor 1.

The upper surfaces of the base portions 41*a*, 41*b* and the bottom surface 2*b* of the coil 2 are positioned substantially on the same plane, and the distances D1 to D4 shown in FIG. 6 are substantially equal to each other on the substantially same plane. Therefore, the clearance between the outer peripheral surface 2*e* of the coil 2 and the inner edges 410*a*2, 410*b*2, 411*a*2, 411*b*2 of the base portions 41*a*, 41*b* can be maintained substantially constant, and further quality improvement of the inductor 1 can be achieved.

Second Embodiment

Figure 8:
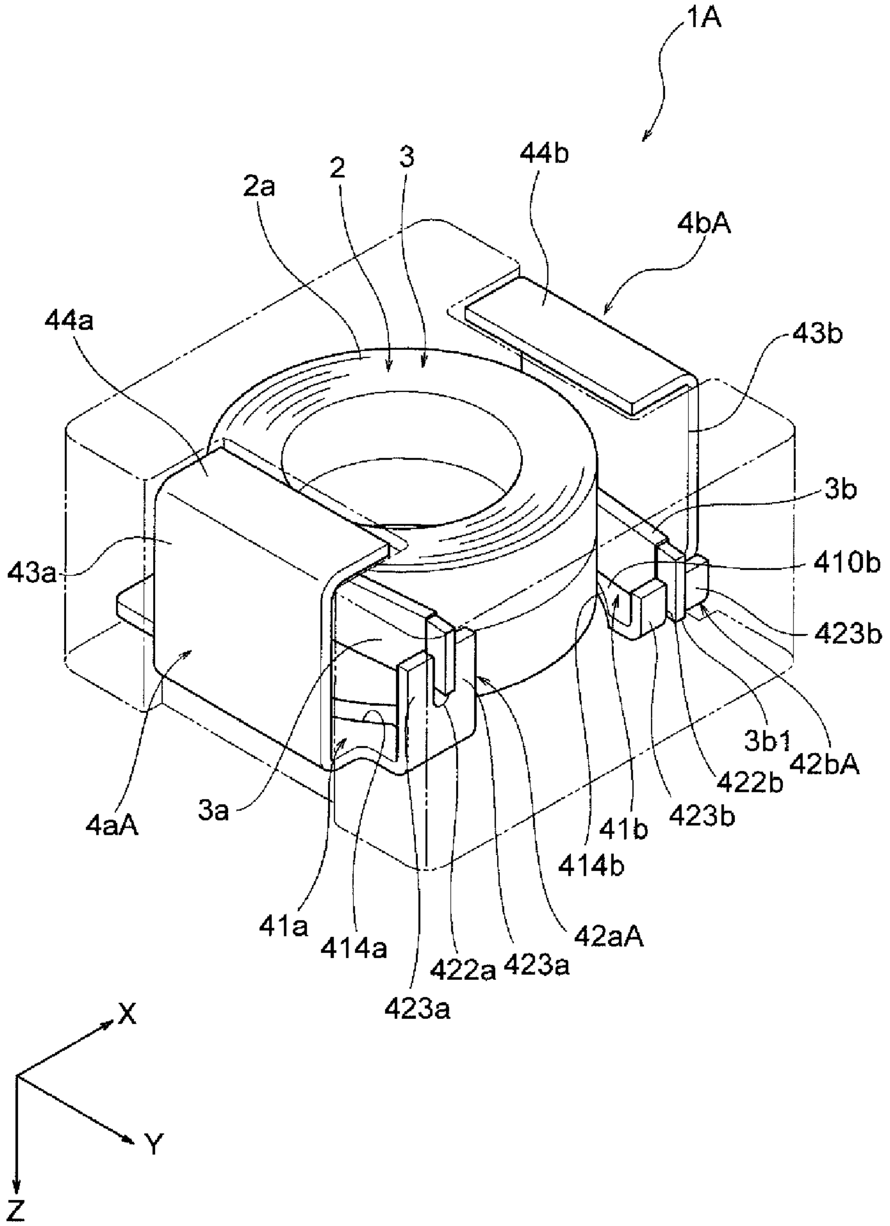
FIG. 8 is a perspective view of a coil device according to a second embodiment of the present invention.

An inductor 1A according to a second embodiment of the present invention shown in FIG. 8 has the same configuration as the inductor 1 according to the first embodiment except for the following points. In FIG. 8, members that are the same as those in the inductor 1 according to the first embodiment are denoted by the same reference numerals, and detailed description thereof will be omitted.

As shown in FIG. 8, the inductor 1A includes terminals 4*a*A, 4*b*A, which differ from the terminals 4*a*, 4*b* in the first embodiment in that the terminals 4*a*A, 4*b*A include wire connecting portions 42*a*A, 42*b*A. The wire connecting portion 42*a*A has a bifurcated shape, and includes an accommodating portion 422*a* and a pair of protruding portions 423*a*. The accommodating portion 422*a* is a groove opened upward, and is cut downward along the Z-axis direction from an upper end of the wire connecting portion 42*a*A. The lead portion 3*a* of the wire 3 can be slid and accommodated from above the wire connecting portion 42*a*A inside the accommodating portion 422*a*. A length of the accommodating portion 422*a* in the Z-axis direction is substantially the same as the length of the notch portion 420*a* in the first embodiment in the Z-axis direction. The lead portion 3*a* is disposed at a position spaced upward from a bottom of the accommodating portion 422*a*, and a gap is formed between the bottom of the accommodating portion 422*a* and the lead bottom portion 3*a*1.

The pair of protruding portions 423*a* are formed on one side and the other side in the X-axis direction with the accommodating portion 422*a* interposed therebetween. The pair of protruding portions 423*a* can prevent the lead portion 3*a* accommodated in the accommodating portion 422*a* from being displaced inward and outward in the X-axis direction.

The wire connecting portion 42*b*A has a bifurcated shape, and includes an accommodating portion 422*b* and a pair of protruding portions 423*b*. The accommodating portion 422*b* is a groove opened upward, and is cut downward along the Z-axis direction from an upper end of the wire connecting portion 42*b*A. Unlike the accommodating portion 422*a*, the accommodating portion 422*b* extends to the base portion 41*b* (the main branch portion 410*b*). In other words, the accommodating portion 422*b* is formed not only at the wire connecting portion 42*b*A but also at the end portion of the base portion 41*b* (main branch portion 410*b*) in the Y-axis direction. By adopting such a configuration, when processing the terminal 4*b*A, it becomes easy to bend the pair of protruding portions 423*b* in a substantially vertical direction with respect to the base portion 41*b*, thereby facilitating the processing of the terminal 4*b*A.

The lead portion 3*b* of the wire 3 can be slid and accommodated from above the wire connecting portion 42*b*A inside the accommodating portion 422*b*. However, the lead portion 3*b* is not accommodated in a part of the accommodating portion 422*b* extending to the end portion of the base portion 41*b* in the Y-axis direction. A length of the accommodating portion 422*b* in the Z-axis direction is smaller than a length of the lead portion 3*b* in the Z-axis direction. Therefore, an upper end portion of the lead portion 3*b* protrudes from above the accommodating portion 422*b*. As in the first embodiment, the lead portion 3*b* is accommodated in the accommodating portion 422*b* so that the lead bottom portion 3*b*1 contacts the upper surface of the base portion 41*b*.

The pair of protruding portions 423*b* are formed on one side and the other side in the X-axis direction with the accommodating portion 422*b* interposed therebetween. The pair of protruding portions 423*b* are arranged substantially parallel to the pair of protruding portions 423*a*.

The present embodiment also has the same effect as the first embodiment. In the present embodiment, since the accommodating portions 422*a*, 422*b* are formed in the terminals 4*a*A, 4*b*A, the accommodating portions 422*a*, 422*b* prevent the lead portions 3*a*, 3*b* from being displaced in the X-axis direction, and the lead portions 3*a*, 3*b* can be firmly fixed to the wire connecting portions 42*a*A, 42*b*A.

Note that the present invention is not limited to the above embodiments, and various modifications can be made within the scope of the present invention.

In each of the above-described embodiments, application examples of the present invention to inductors have been shown, but the present invention may be applied to coil devices other than inductors.

In each of the above embodiments, the wire 3 is made of a flat wire, but may be made of a wire other than a flat wire such as a round wire or a square wire.

In each of the above-described embodiments, the wire 3 is wound in a circular spiral shape, but it may be in an elliptical spiral shape, an angular spiral shape, or the like.

In each of the above embodiments, the core 8 is constituted by two cores, the first core 5 and the second core 6, but the core 8 of the inductor 1 may be constituted by only one core. In this case, the core 8 may be formed inside the mold by compaction molding, injection molding, or the like.

As shown in FIG. 4 and the like, in each of the above-described embodiments, the base portions 41*a*, 41*b* are bifurcated across the groove portions 45*a*, 45*b* respectively, but they may not have the bifurcated shape. That is, the groove portions 45*a*, 45*b* may be omitted from the base portions 41*a*, 41*b*.

REFERENCE SIGNS LIST

1, 1A inductor (coil device)
2 coil
2*a* upper surface
2*b* bottom surface
2*c* first lead-out position
2*d* second lead-out position
2*e* outer peripheral surface
2*f* inner peripheral surface
3 wire
3*a*, 3*b* lead portion
3*a*1, 3*b*1 lead bottom portion
3*a*2, 3*b*2 inner side surface
3*a*3, 3*b*3 outer side surface
30 insulation coating
4*a*, 4*b*, 4*a*A, 4*b*A terminal
41*a*, 41*b* base portion
410*a*, 410*b* main branch portion
411*a*, 411*b* sub branch portion
412*a*, 412*b* main protruding portion
413*a*, 413*b* sub protruding portion
414*a*, 414*b* main curved portion
415*a*, 415*b* sub curved portion
416*b* recess
42*a*, 42*b*, 42*a*A, 42*b*A wire connecting portion
420*a* notch portion
421*a* notch bottom portion
422*a* accommodating portion
423*a* protruding portion
43*a*, 43*b* connecting portion
44*a*, 44*b* mounting portion
45*a*, 45*b* groove portion
5 first core
6 second core
7 frame
8 core
8*a* mounting surface
8*b* non-mounting surface
80 side recess
9 melted portion

What is claimed is:

1. A coil device, comprising:
a coil;
a terminal including a wire connecting portion connected to a lead portion of the coil, and a base portion positioned at substantially the same height as a bottom surface of the coil and holding the wire connecting portion; and
an element body covering the coil together with the wire connecting portion and the base portion, wherein
the base portion includes a main branch portion, a sub branch portion apart from the main branch portion, and a gap between the main branch portion and the sub branch portion,
a curved portion curved along an outer peripheral surface of the coil is formed at a position spaced apart from the outer peripheral surface of the coil on an inner edge of each of the main branch portion and the sub branch portion,
in a plan view, the main branch portion extends forward of the element body along a bottom surface of the element body facing the bottom surface of the coil, and
in a plan view, the sub branch portion extends rearward of the element body along the bottom surface of the element body.

2. The coil device according to claim 1, wherein
the main branch portion includes a main protruding portion that protrudes forward of the element body,
the sub branch portion includes a sub protruding portion that protrudes rearward of the element body, and
one of the main protruding portion and the sub protruding portion is displaced relative to the other of the main protruding portion and the sub protruding portion along a left-right direction perpendicular to a front-rear direction of the element body.

3. The coil device according to claim 1, wherein an outer edge of the main branch portion is curved forward from a side of the element body inside the element body, an outer edge of the sub branch portion is curved rearward from a side of the element body inside the element body, and a radius of curvature of the outer edge of the main branch portion is different from a radius of curvature of the outer edge of the sub branch portion.

4. The coil device according to claim 1, wherein the terminal includes a first terminal and a second terminal, the first terminal includes a first base portion, the second terminal includes a second base portion, the first base portion includes a first main branch portion and a first sub branch portion, the second base portion includes a second main branch portion and a second sub branch portion, the curved portion includes a first main curved portion formed on an inner edge of the first main branch portion, a first sub curved portion formed on an inner edge of the first sub branch portion, a second main curved portion formed on an inner edge of the second main branch portion, and a second sub curved portion formed on an inner edge of the second sub branch portion, and a center position of a virtual circle defined by the first main curved portion, the first sub curved portion, the second main curved portion, and the second sub curved portion substantially coincides with a center position of an inner periphery of the coil.

5. The coil device according to claim 4, wherein an upper surface of the base portion and the bottom surface of the coil are positioned substantially on the same plane, and a distance between the first main curved portion and the outer peripheral surface of the coil, a distance between the first sub curved portion and the outer peripheral surface of the coil, a distance between the second main curved portion and the outer peripheral surface of the coil, and a distance between the second sub curved portion and the outer peripheral surface of the coil, on the substantially same plane, are substantially equal to one another.

6. The coil device according to claim 1, wherein a part of the wire connecting portion is disposed at a position spaced upward from an upper surface of the base portion.

7. The coil device according to claim 1, wherein a center position of the coil is displaced to a side opposite to the wire connecting portion relative to a center of the element body along a front-rear direction of the element body.

8. The coil device according to claim 1, wherein the coil is made of a flat wire.

9. A coil device, comprising:

a coil;

a terminal including a wire connecting portion connected to a lead portion of the coil, and a base portion positioned at substantially the same height as a bottom surface of the coil and holding the wire connecting portion; and an element body covering the coil together with the wire connecting portion and the base portion, wherein the base portion includes a main branch portion and a sub branch portion, and a curved portion curved along an outer peripheral surface of the coil is formed at a position spaced apart from the outer peripheral surface of the coil on an inner edge of each of the main branch portion and the sub branch portion, an outer edge of the main branch portion is curved forward from a side of the element body inside the element body, an outer edge of the sub branch portion is curved rearward from a side of the element body inside the element body, and a radius of curvature of the outer edge of the main branch portion is different from a radius of curvature of the outer edge of the sub branch portion.

10. A coil device, comprising:

a coil;

a terminal including a wire connecting portion connected to a lead portion of the coil, and a base portion positioned at substantially the same height as a bottom surface of the coil and holding the wire connecting portion; and an element body covering the coil together with the wire connecting portion and the base portion, wherein the base portion includes a main branch portion and a sub branch portion, and a curved portion curved along an outer peripheral surface of the coil is formed at a position spaced apart from the outer peripheral surface of the coil on an inner edge of each of the main branch portion and the sub branch portion, the terminal includes a first terminal and a second terminal, the first terminal includes a first base portion, the second terminal includes a second base portion, the first base portion includes a first main branch portion and a first sub branch portion, the second base portion includes a second main branch portion and a second sub branch portion, the curved portion includes a first main curved portion formed on an inner edge of the first main branch portion, a first sub curved portion formed on an inner edge of the first sub branch portion, a second main curved portion formed on an inner edge of the second main branch portion, and a second sub curved portion formed on an inner edge of the second sub branch portion, and a center position of a virtual circle defined by the first main curved portion, the first sub curved portion, the second main curved portion, and the second sub curved portion substantially coincides with a center position of an inner periphery of the coil.

11. The coil device according to claim 10, wherein an upper surface of the base portion and the bottom surface of the coil are positioned substantially on the same plane, and a distance between the first main curved portion and the outer peripheral surface of the coil, a distance between the first sub curved portion and the outer peripheral surface of the coil, a distance between the second main curved portion and the outer peripheral surface of the coil, and a distance between the second sub curved portion and the outer peripheral surface of the coil, on the substantially same plane, are substantially equal to one another.

* * * * *